United States Patent Office 3,496,985
Patented Feb. 24, 1970

3,496,985
NYLON TIRE CORD CONTAINING 2 TO 25%
STYRENE POLYMER
Byron H. Werner, Akron, Ohio, assignor to The Firestone Tire & Rubber Company, Akron, Ohio, a corporation of Ohio
Filed Mar. 12, 1964, Ser. No. 351,428
Int. Cl. C08g 41/02
U.S. Cl. 152—359                         6 Claims

ABSTRACT OF THE DISCLOSURE

The use of nylon tire cord as reinforcing cord in tires has been limited as a result of an undesirable characteristic commonly referred to as "flat spotting." It has been found that flat spotting can be significantly reduced if the tire cord, while predominantly nylon, contains additionally, a fusible, predominantly styrene polymer which is compatible with nylon.

---

Figure 1:
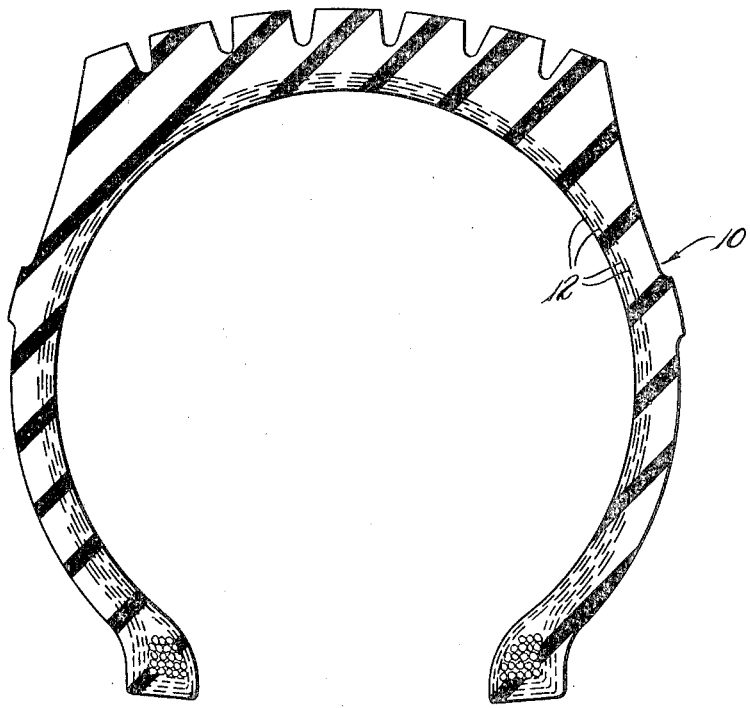

This invention relates to novel tire cords, yarns and filaments for use in nylon tire cord, and tires reinforced with the novel nylon tire cord.

A number of different nylon compositions have been used in the production of tire cord. The use of nylon tire cord has, however, been limited as a result of a phenomenon commonly referred to as "flat-spotting." When a vehicle stands for an extended period of time, those portions of the tires which are in contact with the ground flatten. The flattened portion tends to be retained for a substantial period of time after the vehicle is placed in operation. As the tire rotates, there is a decided thumping or slapping sound resulting from the flat spot on the tire. With many tire cords, what little flat spot is formed runs out quickly. However, the properties of nylon tire cord are such that the flat-spotting is retained substantially longer than with tires utilizing other tire cord materials.

In general, the depth of the flat spot for an 8.50 x 14 size tire is of the order of 200 to 250 mils. The usual approach to prevent flat-spotting has been to increase the modulus of the tire cord by altering the structure of the polyamide chain in the tire cord, e.g., by cross-linking, grafting and/or block polymerization. In general. the modulus is increased until the flat-spot depth is reduced to 160 mils or less.

It has now been found that the predominantly styrene polymers are compatible with nylons such as nylon-6 to a much greater extent than would have been predicted from the properties of the materials. It has further been found that a nylon containing substantial portions of styrene polymers physically blended therewith exhibits properties which render the blend particularly useful as tire cord which tire cord minimizes the problem of flat-spotting in nylon reinforced tires.

The styrene polymers may be blended with nylon material, by any of the well-known methods, prior to filament extrusion. Thus, the materials can be blended in a screw extruder.

The resulting extrudate has remarkable and unexpected properties. For example, the solubility of styrene polymers in benzene is well known. However, when nylon filaments containing blended styrene polymer are stirred in benzene, little, if any, of the styrene polymer is extracted. This would tend to argue against the existence of a physical blend. However, if the nylon in the same filaments is treated with a nylon solvent, such as m-cresol, to swell the nylon, and the solvent-treated produce is then stirred with benzene, substantially all of the styrene polymer dissolves out leaving only the original nylon structure.

The styrene polymers which are useful in accordance with the present invention include the homopolymers of styrene and of the substituted styrenes such as alpha-methyl styrene as well as copolymers of styrenes and substituted styrenes wherein the styrene component predominates, i.e., is substantially in excess of 50% of the polymer. The comonomer portion of the styrene polymer should be substantially free from nylon-reactive functional groups, i.e., groups which react with, degrade, or cross-link with the nylon material with which the copolymer is to be blended. Thus, the comonomers should be substantially free from acid groups, anhydride groups and amino groups. The homopolymers and copolymers should be fusible polymers, that is, they should be capable of being melted without substantial degradation and the resulting melt should exhibit substantial flow characteristics. Examples of particularly useful styrene polymers are polystyrene, poly-alpha-methyl styrene, alpha-methyl styrene-styrene copolymers, styrene-acrylonitrile copolymers, alpha-methyl styrene-acrylonitrile copolymers, acrylonitrile-butadiene-styrene copolymers, methyl methacrylate-styrene copolymers and isobutylene-styrene copolymers. The useful polymers may be either isotactic or atactic. In general, the amount of butadient, isobutylene or methyl methacrylate included as a comonomer should be present in minor proportions, e.g., less than about 20% and preferably less than 10%.

The present invention is particularly useful with nylon-6. It is not, however, restricted to this nylon but is useful with nylons generally. Thus the invention finds use with nylon-6, polycaprolactam; nylon-66, polyhexamethylene adipamide; nylon-610, polyhexamethylene sebacamide; nylon-7, polyenantholactam; nylon-4, polybutyrolactam; and nylon-5, polyvalerolactam.

In the examples which follow, the designated styrene polymer was blended with the specified nylon in a screw extruder. The extruder blend was then drawn at an elevated temperature, cooled, and properties measured. Response lag is determined by suspending a weight of three pounds from a filament, yarn or cord of 50 centimeters in length for a period of four hours. At the conclusion of that period, the total length of the stretched nylon is determined. A portion of the weight, e.g., two pounds, is then removed and the nylon is permitted to relax under the reduced weight for a period of 16 hours. The weight is again increased to the original value and the length of the nylon material is measured after 12 seconds. The difference between the last measurement and the measurement at the conclusion of the first suspension period, measured in mils, is referred to as the response lag. It is important, of course, that the entire test be conducted at constant temperature and humidity. The usual temperature for the test is 25° C.

In comparing the results of response lag tests on a material before and after treatment, a decreasing response lag coupled with a constant or increasing initial modulus is a good indication that there has been a reduction in the tendency of the material to cause flat-spotting. To avoid flat-spotting, the ideal is a response lag of zero. This, of course, has not been attained.

EXAMPLE I

A series of nylon-6-polystyrene blends were prepared in which the polystyrene content was varied from 10 to 25%. The polystyrene was a product of the Dow Chemical Company sold under the trade name Styron 689. The blends were extruded at a temperature of about 520–530° F. with a take-up speed of about 100 feet per minute. The extruded products were drawn at 300° F. at various draw ratios and the properties of the resulting products were measured. Identical tests were run with a nylon-6 control sample. The results are shown in the following Table 1:

TABLE 1

| Composition Nylon-6/ Polystyrene | Draw Ratio | Denier | Tenacity, g./d. | Elong., percent | Response Lag (mils) |
|---|---|---|---|---|---|
| 75/25 | 5.1/1 | 290 | 5.6 | 16.4 | 78 |
| 80/20 | 3.9/1 | 284 | 4.7 | 19.6 | 72 |
| 85/15 | 4.2/1 | 362 | 5.4 | 21.8 | 84 |
| 90/10 | 4.2/1 | 298 | 5.7 | 17.8 | 95 |
| 100/0 (control) | 4.8/1 | 343 | 7.8 | 16.6 | 127 |

EXAMPLE II

Isotactic polystyrene samples were blended with nylon-6 in proportions of 80 parts of nylon-6 to 20 parts of the styrene polymer, extruded at a take-up speed of 100 feet per minute, drawn at a temperature of 350° F. with a draw ratio of 5 to 1 and the properties measured. The results are shown in the following Table 2. These values are to be compared with the properties given for the control sample in Table 1.

TABLE 2

| Composition Nylon-6/ Polystyrene | Temp. of Extrusion, ° F. | Denier | Tenacity, g./d. | Elong., percent | Response Lag (mils) |
|---|---|---|---|---|---|
| 80/20 | 560 | 262 | 5.0 | 14.8 | 77 |
| 80/20 | 520 | 273 | 5.73 | 14.2 | 62 |

EXAMPLE III

Clear, high-impact polystyrene prepared in suspension with an alkali metal alkyl catalyst in a hydrocarbon solvent containing a dissolved hydrocarbon elastomer as described in South African Patent 62/2606 was blended with the nylon-6 of Example I in proportions of 90 parts of nylon-6 to 10 parts of styrene polymer. The blend was extruded at 520° F. at a take-up speed of 100 feet per minute, drawn at 350° F. with a draw ratio of 5.2 to 1 and the properties measured. The drawn product was 360 denier with a tenacity of 5.86 grams per denier, elongation of 18.8% and a response lag of 93 mils.

EXAMPLE IV

Following the general procedures in Example I, styrene-acrylonitrile copolymers manufactured by the Dow Chemical Company and sold under the trade name Tyril 750RS were blended with nylon-6, extruded, the resulting products drawn at 350° F. at a draw ratio of 5.4 to 1, and the properties measured. The results are shown in the following Table 3.

TABLE 3

| Composition Nylon-6/ styrene-acrylontrile | Temp. of Extrusion, ° F. | Take-up Speed, ft./min. | Denier | Tenacity, g./d. | Elong., percent | Response Lag (mils) |
|---|---|---|---|---|---|---|
| 85/15 | 540 | 100 | 384 | 6.2 | 15.9 | 88 |
| 90/10 | 560 | 80 | 431 | 7.2 | 17.5 | 91 |

EXAMPLE V

Poly-alpha-methyl styrene was blended with nylon-6 in proportions of 90 parts of nylon-6 to 10 parts of the styrene polymer. The resulting blend was extruded at 580° F. at a take-up speed of 75 feet per minute, and the resulting product drawn at 350° F. at a draw ratio of 4.8 to 1. The drawn product was 366 denier, had a tenacity of 6.0 grams per denier, an elongation of 6.5% and a response lag of 90 mils.

EXAMPLE VI

A 95% nylon-6/5% polystyrene blend was extruded at a temperature of about 510°–525° F. and drawn at 350° F. at a draw ratio of 5.0 to 1. The resulting yarn was 767 denier, had a tenacity of 6.98 g./den., a breaking elongation of 22.4% and a response lag of 111 mils. Tire cord prepared from the yarn was 1729 denier and had a tenacity of 5.84, a breaking elongation of 25.4% and a response lag of 137 mils. This cord was employed as the reinforcing cord for tires which were then subjected to a tire test as follows:

A tire on a car is placed in contact with a rotating drum. The drum, in turn, causes the tire to rotate. In this manner the tire is caused to rotate for 15 minutes at a rate corresponding to 80 miles per hour. The car is then removed from contact on the drum and allowed to sit overnight. The car is then raised and the tire placed in contact with the rotating drum which causes the tire to rotate at a rate corresponding to 35 miles per hour. The presence of a flat spot on the tire will cause the wheel axle to undergo an acceleration when the flat spot contacts and ceases contact with the drum, along a line passing through the axle and through the point of contact between the drum and the tire. This acceleration of the axle is measured after ½ minute and after five minutes of rotation at a rate corresponding to 35 miles per hour. When the tires of this example were subjected to this test, the initial force exerted on the axle was 3.9 g's. After five minutes the force on the axle was 2.6 g's. Corresponding values for a control tire made up of nylon-6 tires cord without polystyrene were 4.9 g's and 2.1 g's, respectively.

EXAMPLE VII

A series of alpha-methyl styrene copolymers were blended in a screw extruder with Nylon-6 and spun into yarns at a temperature of 520–530° F. In each case the blend contained 20% of the alpha-methyl styrene polymer, the balance being nylon-6. After drawing, the yarns exhibited the properties shown in the following Table 4.

TABLE 4

| Copolymer | Tenacity, g./d. | Elong., percent | Response Lag (mils) |
|---|---|---|---|
| 69/31 alpha-methyl styrene/ acrylonitrile | 4.7 | 19.4 | 114 |
| 80/20 alpha-methyl styrene/ acrylonitrile | 4.2 | 16.7 | 81 |
| 50/50 alpha-methyl styrene/ styrene | 5.8 | 14.4 | 87 |
| Nylon-6, control yarns | | | 127 |

In all of the foregoing examples, as was noted, the styrene polymer and nylon were blended in a screw extruder. However, it has also been found to be advantageous to dissolve the styrene polymer in the nylon polymerization reaction mixture. Thus, the nylon is formed already blended with the styrene polymer. This is particularly advantageous in the production of nylon-6 blends. The styrene polymer can be dissolved in the molten caprolactam monomer.

EXAMPLE VIII 225 grams of caprolactam monomer, 57 grams of a commercial polystyrene manufactured by the Dow Chemical Company under the trade name Styron 666, and 0.45 gram of distilled water were charged to a glass polymerization bottle which was flushed with nitrogen, capped, and heated with agitation to 200° C. This was continued until the polystyrene was completely dissloved in the caprolactam, at which point the temperature was raised to 260° C. for 15½ hours and then to 268° C. for six hours. The polymer at this stage, which was quite viscous, was cooled, broken up and ground. Residual caprolactam was washed from the polymer with hot distilled water, the polymer was dried by a vacuum drier, the dried polymer was spun, oriented by drawing over a hot bar at 300° F. and the properties of the yarn measured. The yarn had a tenacity of 5.07 grams per denier, elongation of 14.3%, and a response lag of 69 mils. The corresponding nylon-6 control had a response lag of 127 mils.

From the foregoing it may be noted that substantial quantities of styrene polymers are readily introduced into the nylon filaments. For tire cord purposes it is preferred to have a nylon-styrene polymer blend containing from 2 to 25% styrene polymer and preferably from 5 to 20%. By introducing the polystyrene into the monomer from which the nylon is to be prepared, particularly effective blending is obtained without the necessity of additional process steps.

Figure 2:
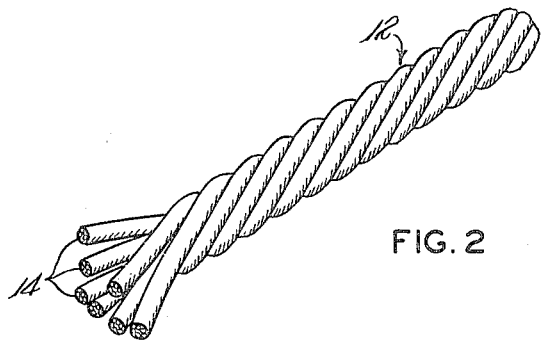

The invention is illustrated on the accompanying drawing, wherein:

FIG. 1 is a sectional view of a pneumatic tire in accordance with this invention, and FIG. 2 is a fragmentary perspective view of a tire cord in accordance with this invention.

In the drawing, there is shown a four-ply pneumatic tire 10 having embedded therein reinforcing cords 12 in accordance with this invention. An isolated cord 12 of the composition disclosed herein is shown in FIG. 2 as comprising a plurality of individual filaments 14 plied and twisted together to form the cord 12.

What is claimed is:

1. As an article of manufacture, nylon cord-reinforced rubber tires, said nylon cord comprising a blend of nylon and from 2 to 25 weight percent of a fusible, predominantly styrene polymer, said predominantly styrene polymer being substantially free from nylon-reactive functional groups.

2. An article of manufacture in accordance with claim 1 wherein said predominantly styrene polymer is selected from the group consisting of polystyrene, poly-alpha-methyl styrene, alpha-methyl styrene-styrene copolymers, styrene-acrylonitrile copolymers, alpha-methyl styrene-acrylonitrile copolymers, acrylonitrile-butadiene-styrene copolymers, methyl methacrylate-styrene copolymers and isobutylene-styrene copolymers.

3. An article of manufacture in accordance with claim 2 wherein the blended product contains from 5 to 20 weight percent of the styrene polymer.

4. As an article of manufacture, nylon cord-reinforced rubber tires wherein said nylon cord is a blend of nylon-6 and from 2 to 25 weight percent of a fusible predominantly styrene polymer, said predominantly styrene polymer being substantially free from nylon-reactive functional groups.

5. An article of manufacture in accordance with claim 4 wherein said predominantly styrene polymer is selected from the group consisting of polystyrene, poly-alpha-methyl styrene, alpha-methyl styrene-styrene copolymers, styrene-acrylonitrile copolymers, alpha-methyl styrene-acrylonitrile copolymers, acrylonitrile-butadiene-styrene copolymers, methyl methacrylate-styrene copolymers and isobutylene-styrene copolymers.

6. An article of manufacture in accordance with claim 5 wherein the blended product contains from 5 to 20 weight percent of the styrene polymer.

References Cited

UNITED STATES PATENTS

| 3,134,746 | 5/1964 | Grabowski | 260—857 |
| 3,218,371 | 11/1965 | Grabowski | 260—857 |
| 3,243,479 | 3/1966 | Seelig | 260—857 |
| 2,550,650 | 4/1951 | Arnold | 250—857 |

FOREIGN PATENTS 517,351  10/1953  Belgium.

MURRAY TILLMAN, Primary Examiner

PAUL LIEBERMAN, Assistant Examiner

U.S. Cl. X.R.

152—330; 260—78, 80.7, 83.7, 85.5, 85.7, 86.7, 88.2, 93.5